US006988197B1

(12) United States Patent
Persson et al.

(10) Patent No.: US 6,988,197 B1
(45) Date of Patent: Jan. 17, 2006

(54) SYNCHRONIZATION OF AUTHENTICATION CIPHERING OFFSET

(75) Inventors: Joakim Persson, Lund (SE); Bernard Smeets, Dably (SE); Tobias Melin, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 815 days.

(21) Appl. No.: 09/632,933

(22) Filed: Aug. 4, 2000

Related U.S. Application Data

(60) Provisional application No. 60/168,375, filed on Dec. 2, 1999.

(51) Int. Cl.
*H04L 9/00* (2006.01)

(52) U.S. Cl. .................... 713/168; 713/169; 713/174; 713/201; 380/28

(58) Field of Classification Search ................ 713/168
See application file for complete search history.

(56) References Cited

U.S. PATENT DOCUMENTS 5,148,007 A * 9/1992 Kruse ......................... 235/382
6,577,633 B1 * 6/2003 Kunito et al. ............ 370/395.3

OTHER PUBLICATIONS

Specification of Bluetooth System, Core, Part B, Chapter 14, pp. 149-178.
Specification of Bluetooth System, Core, Appendix I Revision History, pp. 868-878.
Specification of Bluetooth System, Core, Table of Contents, pp. 5-13.
Specification of Bluetooth System, Profiles, Table of Contents, pp. 5-11.
Frequency Hopping Piconets in an Uncoordinated Wireless Multi-User System U.S. Appl. No. 08/932,911.
An article entitled, "The Bluetooth Forum: Bluetooth Security," *Specification of the Bluetooth System* Version 1.0A, 'On line 1999, XP002171382 Retrieved from Internet: <URL:http://www.bluetooth.com/developer/specification/specification.asp>'retrieved on Jul. 6, 2001 cited in the application p. 148-182.
Copy of International Search Report mailed Jul. 27, 2001.

* cited by examiner

*Primary Examiner*—Kambiz Zand
(74) *Attorney, Agent, or Firm*—Potomac Patent Group PLLC

(57) ABSTRACT

In a communication system, an authentication ciphering offset (ACO) is generated as a function of one or more parameters, wherein at least one of the one or more parameters is derived from earlier-computed values of the ACO. This enables each device to avoid generating an ACO value that is out of synchronization with a counterpart ACO value generated in another communication device.

10 Claims, 7 Drawing Sheets

SYNCHRONIZATION OF AUTHENTICATION CIPHERING OFFSET

This application claims priority under 35 U.S.C. §§119 and/or 365 to Provisional Application No. 60/168,375 filed in the United States on Dec. 2, 1999.

BACKGROUND

The present invention relates to communications systems, and more particularly to synchronization between communicating entities that experience non-controllable delays in an interface between a real-time and a non-realtime layer.

As the number of commonly used computerized, portable devices increases, there is an increased need for communication between these devices. As a result, many standards for providing communication between such devices have been implemented in various data sharing schemes and communication systems.

An example of one such system is called Bluetooth, which has recently been introduced to provide pervasive connectivity especially between portable devices like mobile phones, laptops, personal digital assistants (PDAs), and other nomadic devices. It should be understood that Bluetooth is one of many systems within which the present invention may be employed. Therefore, although some examples of problems to be solved by the present invention will be provided within the context of Bluetooth, those skilled in the art will realize that these examples are merely illustrative, and that the present invention may be employed to solve similar problems within other similar systems.

The Bluetooth system applies frequency hopping to enable the construction of low-power, low-cost radios with a small footprint. The system supports both data and voice. The latter is optimized by applying fast frequency hopping (FH) in combination with a robust voice coding. The fast frequency hopping has a nominal rate of 1600 hops per second (hops/s), corresponding to 800 hops/s in each direction, through the entire 2.4 GHz ISM band, which is 80 MHZ wide.

Devices based on the Bluetooth system concept can create so called piconets, which comprise a master device and one or more slave devices connected via the FH piconet channel. The FH sequence used for the piconet channel is completely determined by the address or identity of the device acting as the master. The system clock of the master device determines the phase in the hopping sequence (i.e., the designation of which one of the possible hops in the sequence is the "current" hop). In the Bluetooth system, each device has a free-running system clock. Each of the slave devices adds a corresponding time offset to its clock that enables it to become aligned with the clock of the master device. By using the master address to select the proper hopping sequence and by using the time offset to align to the master clock, each slave device keeps in hop synchrony to the master device; that is, master and slave devices remain in contact by hopping synchronously to the same hop frequency or hop carrier. For more details, reference is made to U.S. patent application Ser. No. 08/932,911, filed on Sep. 18, 1997 in the name of J. C. Haartsen and entitled "Frequency Hopping Piconets in an Uncoordinated Wireless Multi-user System," which is hereby incorporated herein by reference in its entirety. Also incorporated by reference herein in its entirety is the Specification of the Bluetooth System, version 1.0A, which is available via the Internet at the following Universal Resource Locator (URL): http://www.bluetooth.com.

As set forth in the Specification of the Bluetooth System, two mechanisms have been included to facilitate low level security functionality: authentication and encryption. The authentication procedure is initiated whenever one unit (denoted herein as "unit A") wants some proof of the claimed identity of another unit (denoted herein as "unit B") to which unit A has a Bluetooth radio connection. Once the claimed identities of the involved units have been verified (either single-sided or, if the application that is running over the link so requires, mutually), the units can start using the link for traffic. A prerequisite for a successful authentication is that both units know a common secret, namely, the link key.

The authentication procedure in Bluetooth follows a challenge-response scheme. In short, the verifier generates a challenge in the form of a random number (denoted herein as AU_RAND), that is sent to the claimant. Upon receiving this challenge, the claimant computes a signed response (denoted herein as SRES), that is sent back to the verifier. The verifier can independently compute what the response ought to be (denoted herein as SRES'), given the challenge and the shared secret link key used by the two Bluetooth units. If the received SRES equals the computed SRES', the authentication is considered successful. If, on the other hand, these two numbers differ, the claimant failed to prove its identity. This challenge-response scheme need not be limited to the Bluetooth system, however, and can be employed in a variety of communications systems requiring authentication. In such systems, a challenge-response format may be used with similar or identical values being communicated between various units of the system.

If the application at some point requires data confidentiality, the units may switch encryption on. This process also requires a common secret: the encryption key. The encryption key is different from, but derived from the link key. Usually, the authentication is done at the time of connection setup. Even if it is possible to repeat the authentication process at later times, it is not mandatory. Therefore, a long time may have elapsed since the authentication was done and the encryption is switched on. Consequently there is no real guarantee that none of the units has been replaced by a malicious user during this time (unless the authentication process is frequently repeated).

Hopefully, as soon as encryption is switched on, a fraudulent unit is immediately disclosed. This is because any such unit should not be in possession of the secret link key that is used by the devices originally involved in the link. Therefore, the unit is also unable to derive the encryption key. To further increase difficulties for a malicious unit, the creation of the encryption key is dependant not only on the link key, but also on a number that is denoted "Authentication Ciphering Offset" (ACO). The ACO is a number that is created for every call of the function that generates the SRES. If two units switch on encryption with different ACOs, their respective generated encryption key will differ even if they use the same link key. More information regarding the use of ACOs may be found in Section 3.2.2 of "Specification of the Bluetooth System, Version 1.2. Core System Package. Part H. November 2003".

The computation of SRES and ACO is defined by an algorithm that is denoted $E_1$. More formally, $$E_1: \{0,1\}^{128} \times \{0,1\}^{128} \times \{0,1\}^{48} \rightarrow \{0,1\}^{32} \times \{0,1\}^{96}, \quad (1)$$

$$(K, AU\_RAND, BD\_ADDR) \mapsto (SRES, X)$$

where the notation $\{0, 1\}^i$ denotes a binary number of length i, K is the 128-bit link key, AU_RAND is a 128-bit challenge issued by the verifier, BD_ADDR is the 48-bit Bluetooth device address of the claimant, SRES is a 32-bit signed response, and X is a 96-bit number that is computed at the same time as SRES. It is further noted that the operator "x" does not necessarily represent multiplication, but rather is used to indicate that the parameters to the left of the arrow are applied together in an operation that generates the two parameters to the right of the arrow. This function is defined in Chapter 14 of the *Specification of the Bluetooth System*. It will be understood, however, by those skilled in the art that other suitable algorithms may be employed, either in the Bluetooth system, or other communication systems.

Currently, for each call of $E_1$, each device updates its value of ACO. Thus, in conventional systems, $$ACO=X. \qquad (2)$$

A problem arises in current authentication schemes from the difficulty in synchronizing ACO values. For example, problems may arise from the fact that the current Bluetooth baseband specification says that the units shall always use the latest generated ACO, which may be difficult to ascertain. There are two logical levels of interest to this problem. First, there may be an unknown delay in communications between units. Second, there may be difficulty in determining which transmissions are the latest due to simultaneous or nearly simultaneous transmissions.

FIG. 1 illustrates one possible communications scheme in which authentication and/or encryption may be required between two units. FIG. 1 may relate to the Bluetooth system, or to any other suitable communications system in which authentication and/or encryption are required. As illustrated in FIG. 1, within each unit a Link Manager (LM) 101 generates LM messages, and a Baseband (BB) transmitter 103 executes the actual encoding and transmission of the messages to a BB receiver 105 in the other unit. Likewise, a BB receiver 105 within each unit decodes received bit-streams, and passes these on to the link manager 101 in the layer above. The link manager 101 handles the actual interpretation of the messages.

Unfortunately, due to implementation issues, there may be an unknown delay between the time at which the link manager 101 generates a message and the time at which the BB transmitter 103 transmits that message. The same is true at the receiver side as well: the BB receiver 105 receives a message which is interpreted and handled by the link manager 101 with some unpredictable delay. The above-described situation is true for all sorts of LM messages, including authentication requests within various authentication schemes.

There are several possible reasons for the delay. Clearly, internal hardware design (such as buffering) and the offered traffic load affect this delay. Moreover, the characteristics of the radio channel (such as the interference situation and the signal-to-noise ratio) have an impact. For instance, unit A may have a backlog of messages that have not been delivered yet to unit B because of a bad radio channel. If the link manager 101 in unit A generates a new message, it will be placed in a transmission queue, but it will not be transmitted until all backlogged messages have been sent.

A problem may arise if both units start requesting an authentication of the other side simultaneously (or, to be more precise, within a "short" interval that depends on the actual delay). This is because there is no way to know the length of the delay from the point in time at which an event is generated at one side until the subsequent point in time that the event is registered at the other side. Clearly, in this situation each side needs to call its encryption key generation algorithm $E_1$ two times: once for the request generated by the unit itself, and a second time to generate a response to the request that was received from the other side. As will be illustrated by way of example, due to different delays, the last call at side A may differ from the last call at side B. Consequently, units A and B will generate different encryption keys when encryption is switched on, resulting in their not being able to communicate intelligibly with each other.

FIG. 2 illustrates a case in which both sides end up with the same ACO, resulting in a situation in which they can communicate with one another even after encryption is turned on. The vertical lines represent the time scale of the link manager 101 in each of the units A and B, with time advancing in the downward direction. At step 201, unit A wants to verify the identity of unit B, and so generates a challenge, denoted $AU\_RAND_A$. The challenge is transmitted to unit B. At step 203, unit B receives the challenge from unit A, and responds by calling $E_1$ to generate the two parameters $SRES_A$ and $ACO_A$. (The subscript A in the various parameters indicates that they are associated with unit A's challenge.) Unit B's generated response parameter, $SRES_A$, is then transmitted back to unit A.

At step 205, unit A receives unit B's response parameter, $SRES_A$, and responds by calling $E_1$ to calculate expected response parameters $SRES'_A$ and $ACO_A$. Unit A then can compare the expected signed response, $SRES'_A$ with the actual signed response, $SRES_A$, to determine whether unit B is authentic.

At step 207, unit B wants to verify the identity of unit A, and so generates a challenge, denoted $AU\_RAND_B$. The challenge is transmitted to unit A. At step 209, unit A receives the challenge from unit B, and responds by calling $E_1$ to generate the two parameters $SRES_B$ and $ACO_B$. (The subscript B in the various parameters indicates that they are associated with unit B's challenge.) Unit A's generated response parameter, $SRES_B$, is then transmitted back to unit B.

At step 211, unit B receives unit A's response parameter, $SRES_B$, and responds by calling $E_1$ to calculate expected response parameters $SRES'_B$ and $ACO_B$. Unit B then can compare the expected signed response, $SRES'_B$ with the actual signed response, $SRES_B$, to determine whether unit A is authentic.

Sometime later, the units decide to utilize encryption in their communication with one another. Accordingly, at step 213, unit A turns on encryption, using its most recently generated value of ACO to generate the encryption key that it will use. Similarly, at step 215, unit B turns on encryption, using its most recently generated value of ACO to generate the encryption key that it will use. In this case, the most recently generated value of ACO at both unit A and unit B is $ACO_B$. Consequently, both units will generate the same encryption key, and will be able to continue communicating with one another.

Turning now to FIG. 3, this illustrates an example in which delays in transmission cause the two units A and B to end up with different ACO values, thereby making it impossible to communicate after encryption is turned on. More specifically, at step 301, unit A wants to verify the identity of unit B, and so generates a challenge, denoted $AU\_RAND_A$. The challenge is transmitted to unit B. However at step 303, which is prior to receipt of the challenge from unit A, unit B also decides to verify the identity of unit A, and so generates its own challenge, denoted $AU\_RAND_B$.

At step 305, unit A receives unit B's challenge and responds by calling $E_1$ to generate the two parameters $SRES_B$ and $ACO_B$. (The subscript B in the various parameters indicates that they are associated with unit B's challenge.) Unit A's generated response parameter, $SRES_B$, is then transmitted back to unit B.

Similarly, at step 307 unit B receives unit A's challenge (transmitted at step 301) and responds by calling $E_1$ to generate the two parameters $SRES_A$ and $ACO_A$. (The subscript A in the various parameters indicates that they are associated with unit A's challenge.) Unit B's generated response parameter, $SRES_A$, is then transmitted back to unit A.

At step 309, unit B receives unit A's response parameter, $SRES_B$, and responds by calling $E_1$ to calculate expected response parameters $SRES'_B$ and $ACO_B$. Unit B then can compare the expected signed response, $SRES'_B$ with the actual signed response, $SRES_B$, to determine whether unit A is authentic.

Similarly, at step 311, unit A receives unit B's response parameter, $SRES_A$, and responds by calling $E_1$ to calculate expected response parameters $SRES'_A$ and $ACO_A$. Unit A then can compare the expected signed response, $SRES'_A$ with the actual signed response, $SRES_A$, to determine whether unit B is authentic.

Sometime later, the units decide to utilize encryption in their communication with one another. Accordingly, at step 313, unit A turns on encryption, using its most recently generated value of ACO to generate the encryption key that it will use. Similarly, at step 315, unit B turns on encryption, using its most recently generated value of ACO to generate the encryption key that it will use. In this case, the most recently generated value of ACO at unit A is $ACO_A$, whereas the most recently generated value of ACO at unit B is ACO B Consequently, the units A and B will generate different encryption keys, thereby making it impossible to continue communicating with one another.

The problem depicted in FIG. 3 can be averted by using special rules. For example, in the current version of the Bluetooth baseband specification, a solution is provided for by using the following rule:

In case of mutual authentication, the ACO value from the second authentication is retained. However, in some situations an authentication event may be initiated simultaneously in both devices. When this happens, there is no way of telling which is the first and which is the second event. Then, both units shall use the ACO resulting from the challenge generated in the master unit.

A second unit (unit B) can determine that an authentication event has been generated simultaneously, or nearly simultaneously, in a first unit (unit A) when a challenge is received from unit A, but a response to a previously sent challenge originating in unit B is expected. In this case, the authentication event initiated by unit B is considered to be open. An authentication event is considered to be open by the originating side until the response has been received. The event is closed when the response has been received and processed by the originating side. Therefore, in a situation similar to the one in FIG. 3, using the Bluetooth rule stated above, unit B would observe that it had received an authentication request at step 307 rather than the expected response to the previously sent challenge, sent at step 303. Therefore, because the request initiated at unit B in step 303 is considered open, $ACO_A$ resulting from the challenge generated by the master unit A at step 301 will be used by unit B, rather than $ACO_B$. Likewise, unit A would also receive an authentication request (step 305) while its authentication event initiated at step 301 was open and would therefore also use $ACO_A$ according to the same rule. By use of this rule, devices communicating in a Bluetooth system would therefore avert the problem shown in FIG. 3.

Turning now to FIG. 4, this illustrates an example in which delays in a Bluetooth system, either in transmission or processing, cause the two units A and B to end up with different ACO values, thereby making it impossible to communicate after encryption is turned on. Thus, despite the rule which facilitates communication in a situation like the one depicted in FIG. 3, delays could cause difficulty in communication in a Bluetooth system that uses the same rule. More specifically, at step 401, unit A wants to verify the identity of unit B, and so generates a challenge, denoted $AU\_RAND_A$. The challenge is transmitted to unit B. However at step 403, which is prior to receipt of the challenge from unit A, unit B also decides to verify the identity of unit A, and so generates its own challenge, denoted $AU\_RAND_B$.

At step 405, unit B receives unit A's challenge (transmitted at step 401) and responds by calling $E_1$ to generate the two parameters $SRES_A$ and $ACO_A$. (The subscript A in the various parameters indicates that they are associated with unit A's challenge.) Unit B's generated response parameter, $SRES_A$, is then transmitted back to unit A. Unit B generates this response knowing that its authentication request is open, and it will therefore use the ACO value generated by the master, unit A, according to the Bluetooth specification rule.

At step 407, unit A receives unit B's response parameter, $SRES_A$, at a time denoted $t_A$, and responds by calling $E_1$ to calculate expected response parameters $SRES'_A$ and $ACO_A$. Unit A then can compare the expected signed response, $SRES'_A$ with the actual signed response, $SRES_A$, to determine whether unit B is authentic. Unit A performs this calculation without knowing that nearly simultaneous verification events have taken place because unit B's request is received after its response to unit A's request, when unit A's authentication event is already closed.

At step 409, unit A receives unit B's challenge and responds by calling $E_1$ to generate the two parameters $SRES_B$ and $ACO_B$. (The subscript B in the various parameters indicates that they are associated with unit B's challenge.) Unit A's generated response parameter, $SRES_B$, is then transmitted back to unit B.

At step 411, unit B receives unit A's response parameter, SRES B, at a time denoted $t_B$. However, rather than calling $E_1$ to calculate expected response parameters $SRES'_B$ and $ACO_B$, unit B calculates $SRES'_B$ but retains $ACO_A$ from the master unit A in accordance with the rule of the Bluetooth specification.

The problem illustrated in FIG. 4 arises because the authentication request from unit B $AU\_RAND_B$, generated at step 403 by unit B, is received by unit A (step 409) after receipt of the signed response $SRES_A$, which is generated at step 405 by unit B and received at time $t_A$ at step 407 by unit A. Consequently, unit A does not know that the two authentication requests have been generated nearly simultaneously because unit A's authentication request event is closed at time $t_A$ before the authentication request generated by unit B is received. Therefore, unit A does not apply the Bluetooth specification rule that requires both units to use the master's ACO value, but instead uses $ACO_B$. However, unit B receives unit A's authentication request, which is generated by unit A at step 401 and received by unit B at step 405 after unit B has generated its authentication request at step 403. Because the authentication request generated by unit A is received after the authentication request generated by unit B but before a response is received from unit A at step 411, unit B realizes that the two authentication requests are nearly simultaneous, and applies the Bluetooth specification rule which requires unit B to use the ACO value of the master unit, or $ACO_A$.

As a consequence of this time delay of unit B's authentication request, when the two devices later turn on encryption, unit A utilizes $ACO_B$, as shown at step 413, and unit B utilizes $ACO_A$, as shown at step 415. As a consequence, once encryption is turned on by the two units using different ACO values, communication will be impossible.

In the examples described above, it was assumed that each unit generates its expected signed response, SRES', only after receiving the actual signed response from the other unit. However, this is not a requirement, as a unit could, for example, generate its expected signed result (SRES') at the same time that it generates the challenge, AU_RAND. Such a determination of when an SRES' is generated may be dependent on the system in which it is being implemented. The *Specification of the Bluetooth System*, for example, leaves the particular implementation up to the developer. Because there is no requirement that it be done one way or the other, it is possible that one unit, made by a first manufacturer, will compute SRES' at the same time that it generates the challenge, while the other unit, made by a different manufacturer, will generate its SRES' only upon receiving the signed response from the other side. In such a scenario, the two units could again end up with different most-recently-generated values of ACO, which makes it impossible for them to generate the same encryption key when encryption is turned on.

There is therefore, a need for a system that avoids the problems associated with the prior art, such as the possibility of ending up with different ACO values, and thereby using incompatible encryption.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The foregoing and other objects are achieved by the present invention, which may be used in a communication system. One such system is the Bluetooth system. In accordance with an aspect of the invention, an authentication ciphering offset (ACO) is generated as a function of one or more parameters, wherein at least one of the one or more parameters is derived from earlier-computed values of the ACO. This enables each device to avoid generating an ACO value that is out of synchronization with a counterpart ACO value generated in another communication device thereby avoiding problems caused by uncontrollable delays associated with the prior art systems, for example.

BRIEF DESCRIPTION OF THE DRAWINGS

The objects and advantages of the invention will be understood by reading the following detailed description in conjunction with the drawings in which.

DETAILED DESCRIPTION

Figure 1:
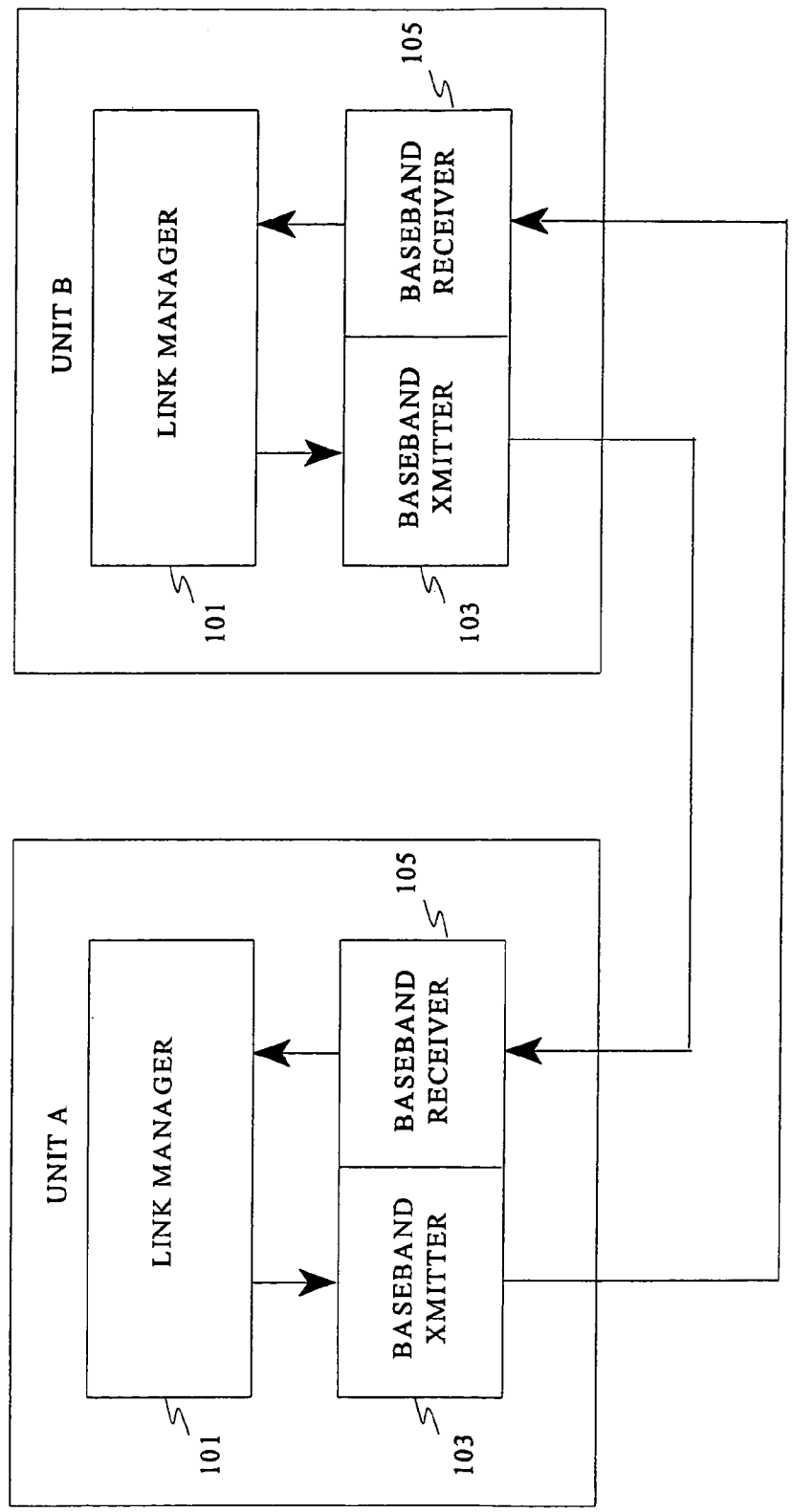
FIG. 1 is a block diagram of two units, each having a link manager, a baseband transmitter and a baseband receiver.
Figure 2:
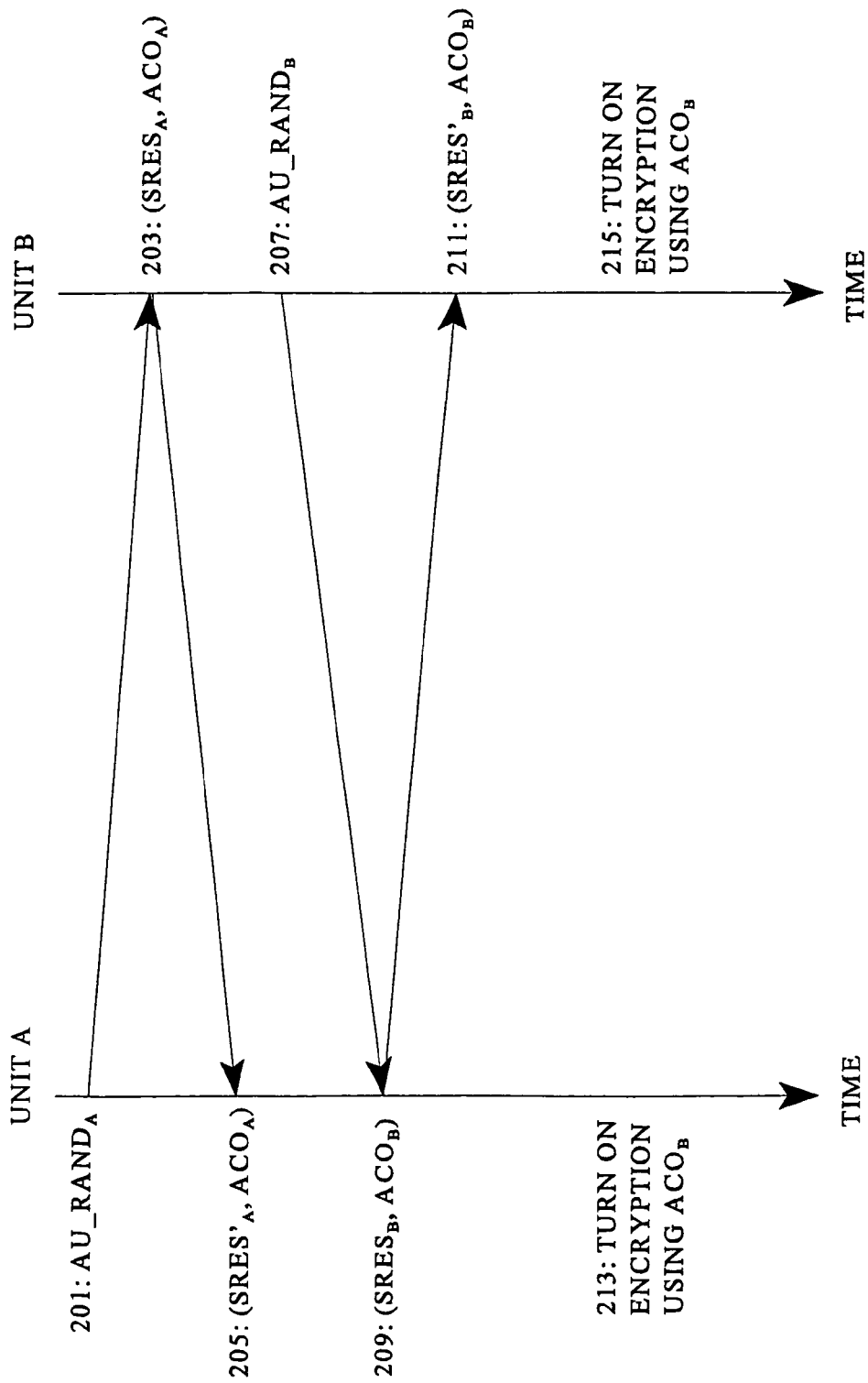
FIG. 2 is a timing diagram of authentication signaling in an instance when both units end up with a same value of ACO.

The various aspects of the invention will now be described in detail in connection with a number of exemplary embodiments and with respect to the figures, in which like parts are identified with the same reference characters. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

The problems associated with the prior art can be overcome by using a new function that generates the "Authentication Ciphering Offset" (ACO) as a function of all earlier-computed values of ACO, in addition to other possible parameters.

Figure 5:
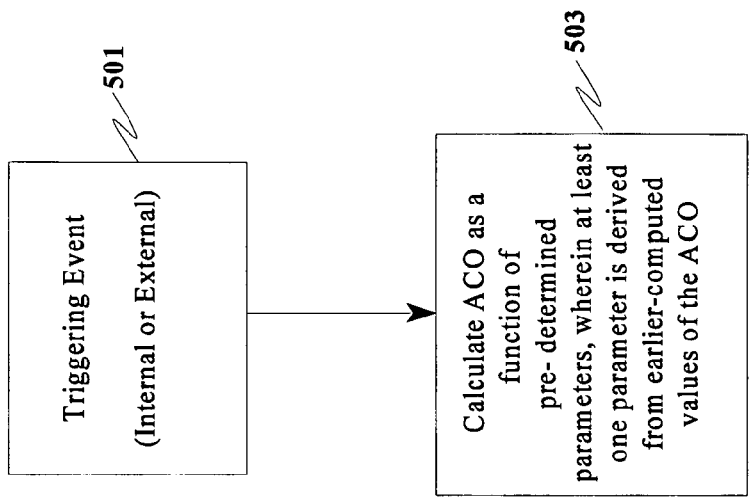
FIG. 5 is a flow diagram of the computation of an ACO value in accordance with one embodiment of the present invention.

As illustrated in FIG. 5, a triggering event (step 501) triggers a particular device or communications unit to calculate an ACO as a function of pre-determined parameters (step 503), at least one of which is derived from earlier computed values of the ACO. The triggering event 501 may be any one of a number of internal or external triggering events. For example, an external triggering event may be an authentication request, or a signed response received from another device. Examples of internal triggering events may include certain timed events, and the like. As to generating a new ACO value, any commutative binary function is sufficient for creating an ACO value based upon previous values, which is not dependent upon order.

In an exemplary embodiment, each unit keeps a running sum (bitwise modulo-2) of the ACO values, and combines a most recent value of ACO with a presently generated value of X (produced by calling $E_1$). Thus, after the $k^{th}$ call of $E_1$, the ACO becomes:

$$ACO_k = X_k \oplus ACO_{k-1} = \sum_{i=1}^{k} X_i, \quad (3)$$

where, in this exemplary embodiment, the sum is bitwise modulo-2. This sum may advantageously be generated by employing an exclusive-OR (XOR) function. The value of $X_k$ may be computed in the conventional way, using the function denoted $E_1$.

Since the order of the elements in the sum is irrelevant, the two units A and B will have identical ACO values whenever the following result is satisfied:

{$X_i^{(A)}|i=1 \ldots k$}={$X_i^{(B)}|i=1 \ldots k$}. As a result, situations similar to the example described in FIG. 3 and FIG. 4 will not cause any problem when encryption is switched on.

Techniques other than summing all of the previous ACO values using XOR operations may also be employed. For example, any variety of functions using previous values of ACO may be employed to maintain the same ACO in both units, so long as the selected function or functions satisfy the commutative law. Simple boolean functions such as logical AND, NAND, OR, NOR, addition, subtraction, and multiplication functions could be used. One might, for example, use any commutative binary operations between $X_k$ and $ACO_{k-1}$, shown in Equation 3. Additionally, more complex functions, such as convolution sums, for example, could also be used.

It should be noted, however, that simple binary functions other than XOR functions may not be desirable as they may create an ACO that, after many iterations, tends toward a specific result, thereby generating an ACO that may be predictable. Furthermore, more complex functions may not be desirable as they may increase the computational complexity of the algorithm significantly. However, as processing speeds increase, more complicated algorithms, or combinations of multiple algorithms may be desirable, as they may produce ACO values which are more difficult to predict.

Figure 3:
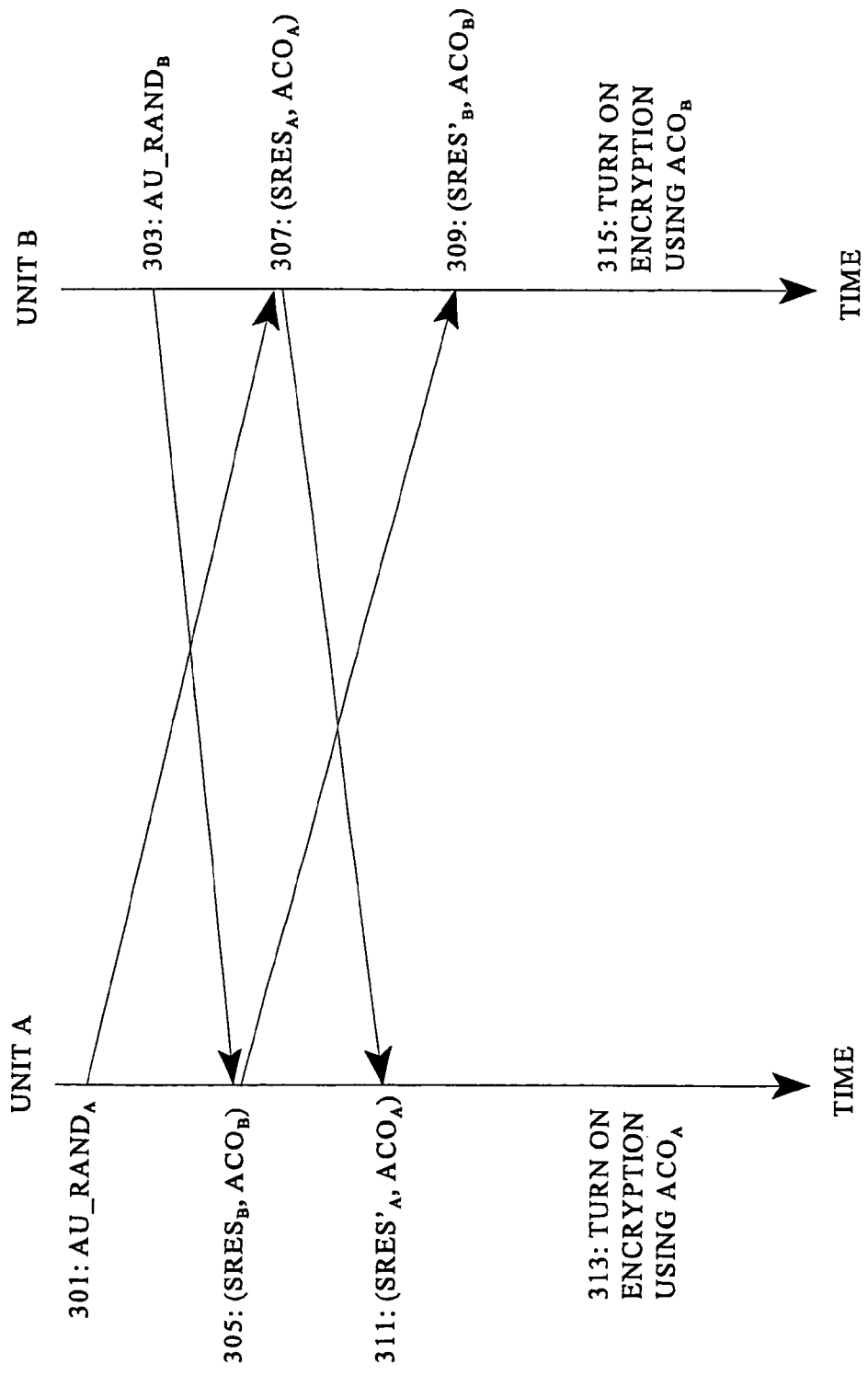
FIG. 3 is a timing diagram of authentication signaling in the prior art in an instance when both units end up with different values of ACO.
Figure 6:
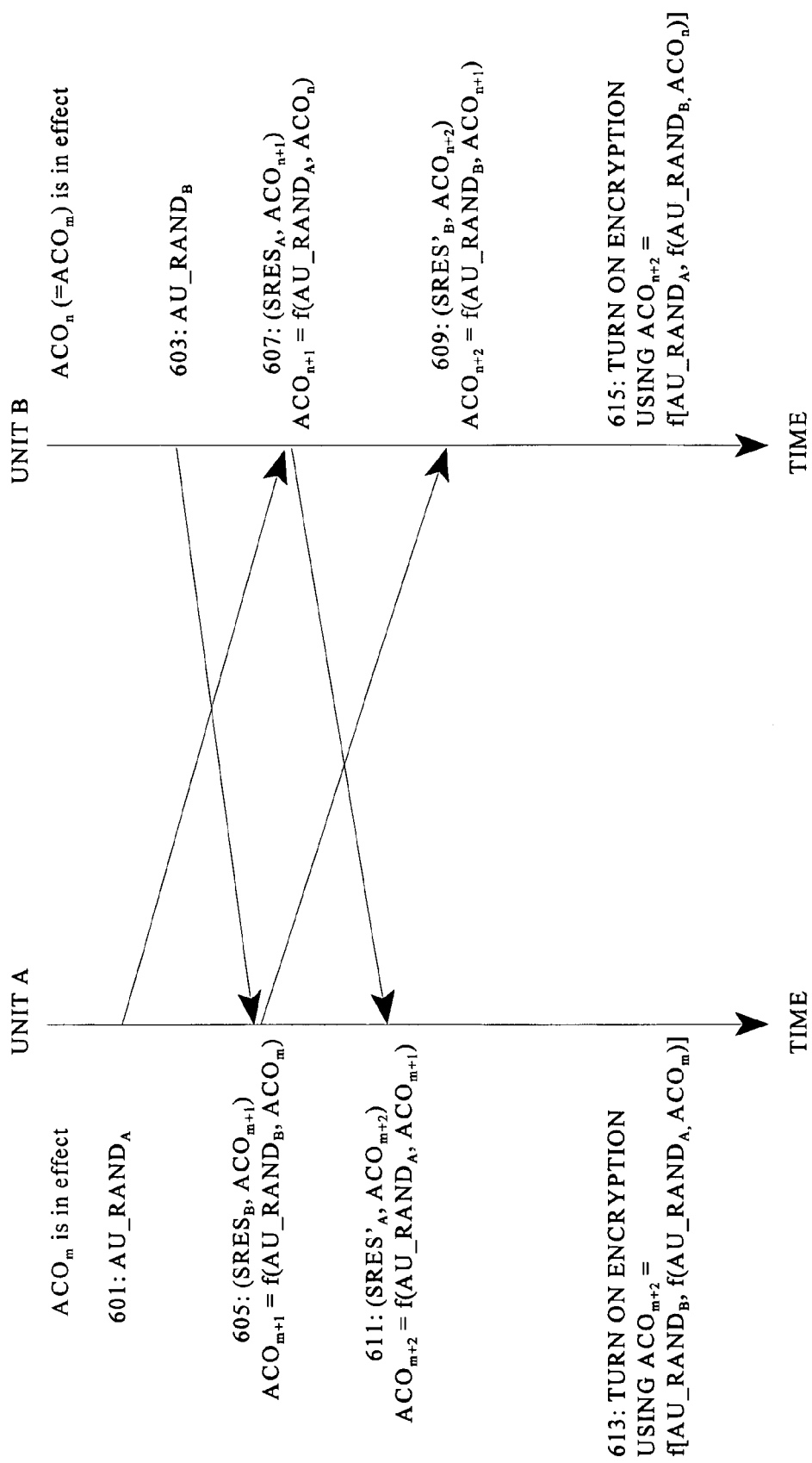
FIG. 6 is a timing diagram of how the present invention may be implemented in a communications system.

FIG. 6 illustrates an example of how the present invention may be employed in a communications system to avoid the problem illustrated in FIG. 3. In FIG. 3, challenges generated by both units nearly simultaneously cause the two units A and B to end up with different ACO values, thereby making it impossible to communicate after encryption is turned on. However, in FIG. 6, using the present invention, each new value of ACO is calculated using the previous ACO values, thereby allowing both units to end up with the same ACO values, and communicate even when encryption is switched on. In the situation illustrated in FIG. 6, unit A and unit B begin with equivalent ACO values. Specifically, unit A begins with $ACO_m$ in effect, and unit B begins with $ACO_n$ (which is equivalent to $ACO_m$) in effect.

At step 601, unit A wants to verify the identity of unit B, and so generates a challenge, denoted $AU\_RAND_A$. The challenge is transmitted to unit B. However, at step 603, which is prior to the receipt of the challenge from unit A, unit B also decides to verify the identity of unit A, and so generates its own challenge denoted $AU\_RAND_B$.

At step 605, unit A receives unit B's challenge (transmitted at step 603) and responds by calling $E_1$ to generate the two parameters $SRES_B$ and $ACO_{m+1}$. In this example, $ACO_{m+1}$ is derived as a function of $AU\_RAND_B$ and the previous ACO value. $ACO_{m+1}$ may be calculated in the manner described in equation 3, or using other suitable commutative binary functions. Unit A's generated response parameter $SRES_B$ is then transmitted back to unit B.

Similarly, at step 607 unit B receives unit A's challenge (transmitted at step 601) and responds by calling $E_1$ to generate the two parameters $SRES_A$ and $ACO_{n+1}$. $ACO_{n+1}$ is derived as a function of $AU\_RAND_A$ and the previous ACO value. $ACO_{n+1}$ may be generating using any commutative binary algorithm, including the one shown in equation 3, for example. Unit B's generated response parameter $SRES_A$, is then transmitted back to unit A.

At step 609, unit B receives unit A's response parameter, $SRES_B$, and responds by calling $E_1$ to calculate the expected response parameter $SRES'_B$ and $ACO_{n+2}$, which is a function of $AU\_RAND_B$ and $ACO_{n+1}$. Unit B then can compare the expected signed response, $SRES'_B$ with the actual signed response, $SRES_B$, to determine whether unit A is authentic.

Similarly, at step 611, unit A receives unit B's response parameter $SRES_A$ and responds by calling $E_1$ to calculate the expected response parameters $SRES'_A$ and $ACO_{m+2}$, which is a function of $AU\_RAND_A$ and $ACO_{m+1}$. Unit A then can compare the expected signed response $SRES'_A$ with the actual signed response $SRES_A$ to determine whether unit B is authentic.

Sometime later, the units decide to utilize encryption in their communication with one another, either at a predetermined time, or by a start encryption request. Accordingly, at step 613, unit A turns on encryption, using its most recently generated value of ACO to generate the encryption key that it will use. Similarly, at step 615, unit B turns on encryption using its most recently generated value of ACO to generate the encryption key that it will use. In this case, the most recently generated ACO value for unit A is $ACO_{m+2}$, and the most recently generated ACO value for unit B is $ACO_{n+2}$. However, these values will be equivalent if the two units begin with equivalent values (i.e., $ACO_m=ACO_n$), and if the operations performed at each generation of ACO values are commutative, so that the order of operation does not change the outcome of computation, such as the commutative function shown in Equation 3, for example. Thus, unit A and unit B will end up with equivalent ACO values, and will be able to communicate, even when encryption is switched on. Additionally, equivalent ACO values will be maintained in both units despite unknown delays or simultaneous authentication requests. Thus, the present invention alleviates the problem described in connection with FIG. 3.

Figure 4:
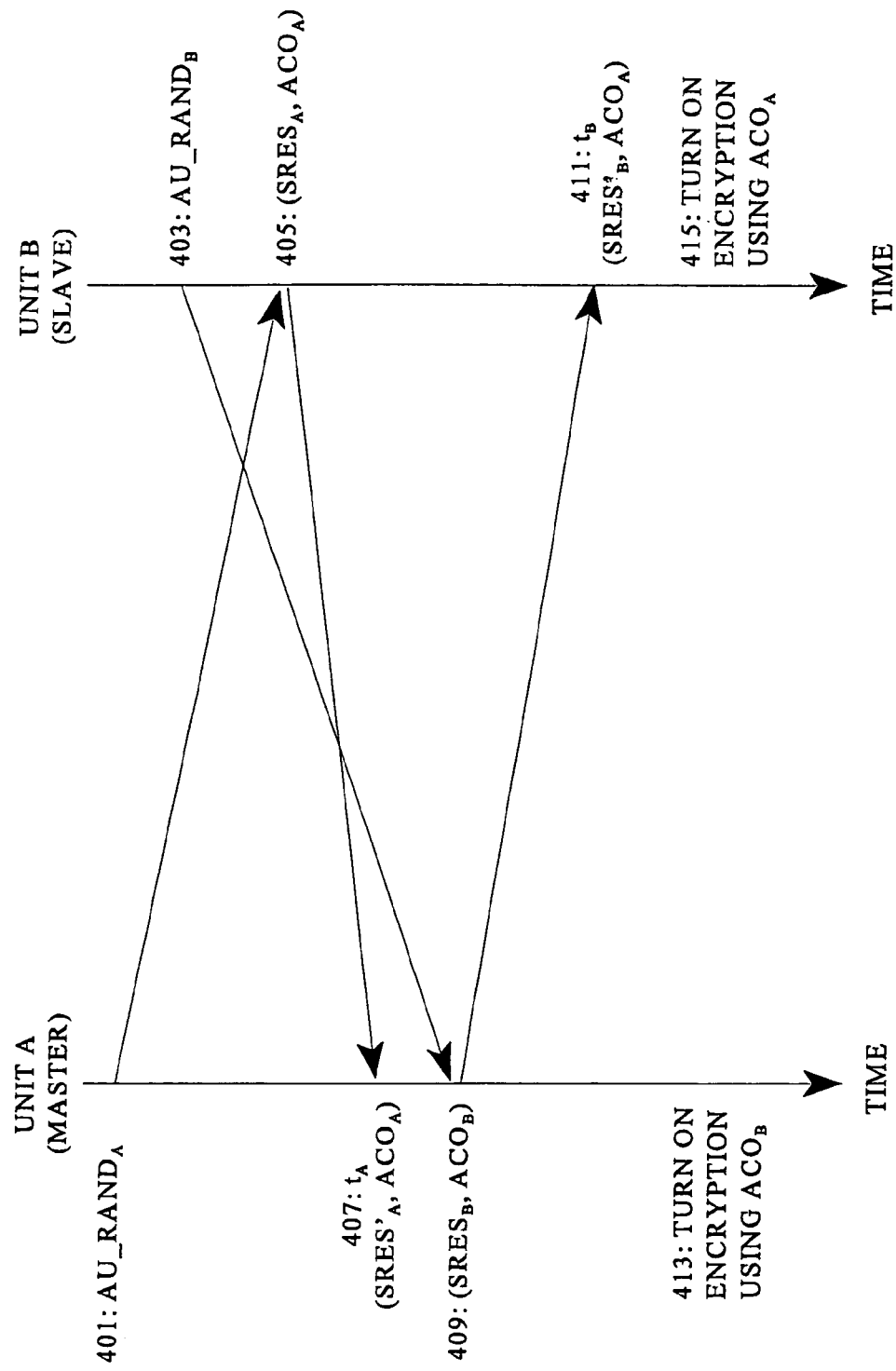
FIG. 4 is a timing diagram of authentication signaling in the prior art in an instance when both units have the potential of using different values of ACO because of a delayed signal.
Figure 7:
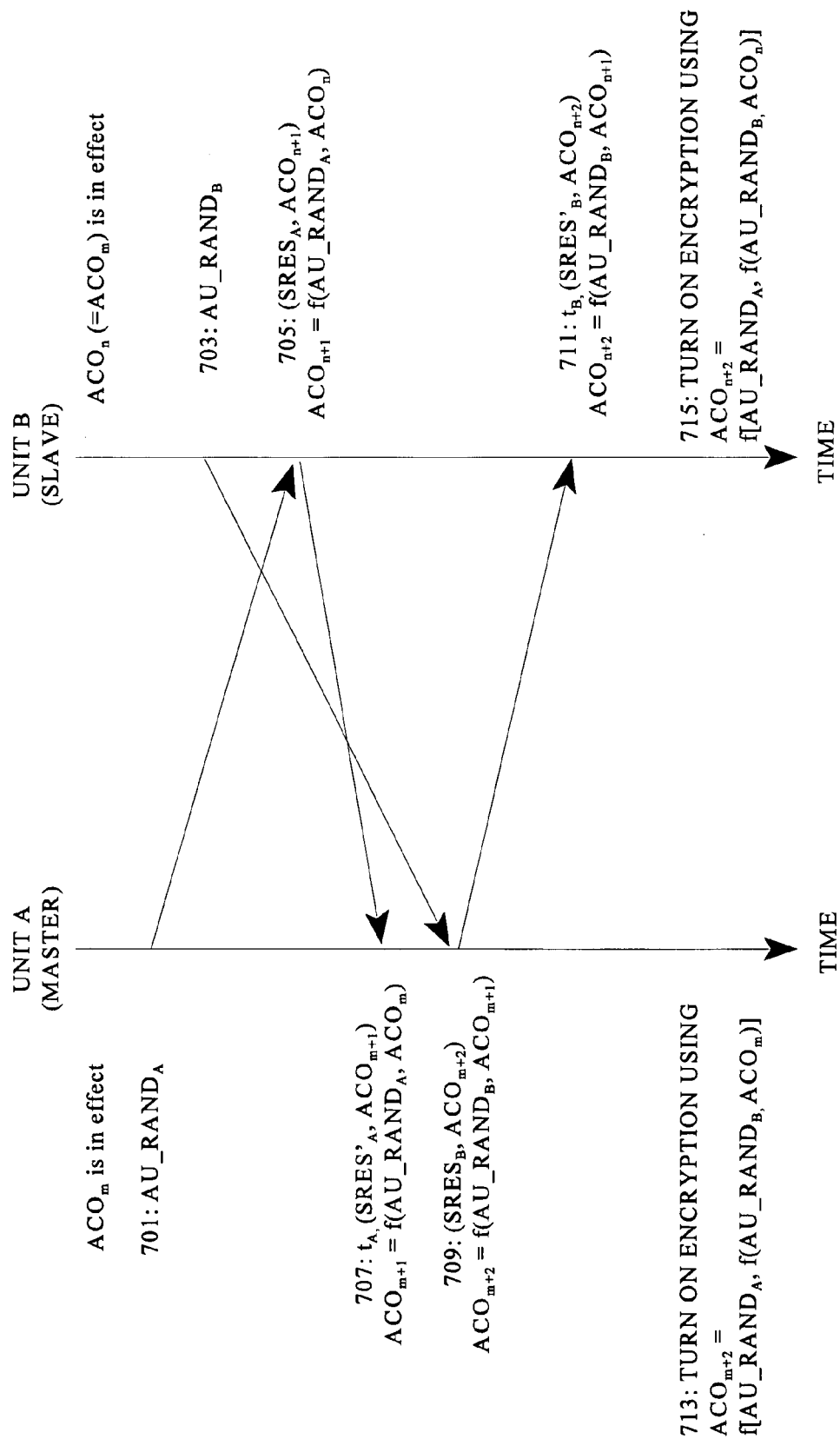
FIG. 7 is a timing diagram of how the present invention may be implemented in a communication system employing certain rules.

Turning now to FIG. 7, this illustrates an example in which the problem described in connection with FIG. 4 has been remedied using the present invention. In FIG. 4, delays in transmission or processing of a challenge in a Bluetooth system cause the two units to use different ACO values, making communication impossible once communication is switched on. Both units begin the situation described in FIG. 7 using equivalent ACO values (i.e., $ACO_m = ACO_n$). In FIG. 7, unit A generates an authentication request, or challenge, denoted $AU\_RAND_A$ at step 701, which is then transmitted to unit B. Similarly, unit B transmits a request, or challenge $AU\_RAND_B$ at step 703, which it transmits to unit A. At step 705, unit B receives the challenge generated by unit A at step 701, and generates the signed response $SRES_A$ and $ACO_{n+1}$. $ACO_{n+1}$ is computed as a function of $AU\_RAND_A$ and the previous ACO value, namely $ACO_n$. The signed response $SRES_A$ is then sent to unit A, which receives it at time $t_A$ shown at step 707. Unit A may then generate $ACO_{m+1}$, which is a function of $AU\_RAND_A$ and $ACO_m$, the previous ACO value. Unit A may also generate at this step an expected signed response $SRES'_A$ so that it can validate the authenticity of unit B. At step 709, unit A receives the challenge generated by unit B at step 703, and in response, generates a signed response $SRES_B$, and calculates $ACO_{m+2}$, which is a function of $AU\_RAND_B$ and $ACO_{m+1}$. The calculation of each ACO value may be performed using any commutative binary operation, such as the one that is shown in equation 3, for example. Unit A then transmits the signed response to unit B, which receives it at time $t_B$ at step 711. Under the rules of the Bluetooth specification, unit B would retain $ACO_{n+1}$ for future use, as both authentication requests were generated nearly simultaneously, which unit B is aware of due to the fact that it received a challenge from unit A while it had an open event (begun with the challenge generated at step 703). However, in accordance with the present invention, a new value $ACO_{n+2}$ may instead be calculated at time $t_B$ at step 711 as a function of $AU\_RAND_B$ and $ACO_{n+1}$. This calculation may be accomplished using any commutative binary operation, such as the one shown in equation 3, for example.

Thanks to the use of the present invention, when unit A and unit B decide to turn on encryption at step 713 and step 715, respectively, they will both use their latest ACO values, which are equivalent to one another, to determine an encryption key, and will therefore be able to communicate even when encryption is switched on. It should be noted, that the use and calculation of each ACO value by a particular unit associated with an event initiated by that unit is illustrated as being delayed until the event is closed in FIG. 7. However, this need not be the case, and the ACO value associated with that unit may be calculated at the time a challenge is issued by that unit, or at any other suitable time. However, potential problems may arise if an ACO value associated with a particular challenge event is used before the event is closed, in situations where an event is lost, not returned, or timed out, for example.

The invention achieves a number of advantages over, and solves problems associated with, conventional approaches. It eliminates real-time requirements of guaranteed response time. It makes the order of ACO computations insignificant. Real-time issues with different delays between layers are less of a problem. Thus, the present invention allows real-time and non-real-time devices to be used in the same communications system, as it calculates ACO values independent of the order in which they are received. ACO values are also calculated independent of any delays in transmission, receiving, or processing. Moreover, the computational complexity of the invention is negligible. No extra storage is required compared to the old solution.

The invention has been described with reference to a particular embodiment. However, it will be readily apparent to those skilled in the art that it is possible to embody the invention in specific forms other than those of the preferred embodiment described above. This may be done without departing from the spirit of the invention.

Furthermore, the invention has been described with respect to particular embodiments to overcome the concern that delays in communication will cause the ACO parameters to be unsynchronized between two units. However, the same principle of making a parameter a function, at least in part, of its past values can be applied to any system where delays cause problems with synchronization of any such parameters. Some such systems may include, but are not limited to, any real-time systems in which unpredictable delays may exist, and can cause potential problems. Some examples of such systems may include: wireless systems, such as mobile telephony systems, wireless paging systems, and wireless Internet systems; and wired systems, such as the Internet, landline telephone systems, dial-up networking systems, LANs, WANs, or the like. Any system that has applications at both ends of a communications link that exchange data in which unpredictable delays may cause problems could benefit from using the present invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating an authentication ciphering offset (ACO) in a communication device, the method comprising:

generating the ACO as a function of two or more parameters, wherein at least one of the two or more parameters is derived from earlier-computed values of the ACO, wherein the ACO is a number from which a ciphering key for the communication device is derived, and which is never communicated to any other communication device; and wherein the step of generating the ACO as a function of two or more parameters comprises generating a kth value, $X_k$ from one or more of the parameters, and applying a commutative binary operation between $X_k$ and a previous value, $ACO_{k-1}$.

2. The method of claim 1, wherein the step of generating the ACO as a function of two or more parameters comprises:

generating a kth value of ACO as a running sum in accordance with:

$$ACO_k = X_k \oplus ACO_{k-1} = \sum_{i=1}^{k} X_i,$$

wherein $X_i$ is generated as a function of the two or more parameters excluding the at least one of the two or more parameters that is derived from earlier-computed values of the ACO.

3. The method of claim 2, wherein the sum is a bitwise modulo-2 sum.

4. The method of claim 3, wherein the bitwise modulo-2 sum is performed by means of a bitwise exclusive-OR (XOR) operation.

5. An apparatus for generating an authentication ciphering offset (ACO) in a communication device, the apparatus comprising:

logic configured to generate the ACO as a function of two or more parameters, wherein at least one of the two or more parameters is derived from earlier-computed values of the ACO, wherein the ACO is a number from which a ciphering key for the communication device is derived, and which is never communicated to any other communication device; and wherein the logic configured to generate the ACO as a function of two or more parameters comprises logic configured to generate a kth value, $X_k$ from one or more of the parameters, and to apply a commutative binary operation between $X_k$ and a previous value, $ACO_{k-1}$.

6. The apparatus of claim 5, wherein the logic configured to generate the ACO as a function of two or more parameters comprises:

logic configured to generate a kth value of ACO as a running sum in accordance with:

$$ACO_k = X_k \oplus ACO_{k-1} = \sum_{i=1}^{k} X_i,$$

wherein $X_i$ is generated as a function of the two or more parameters excluding the at least one of the two or more parameters that is derived from earlier-computed values of the ACO.

7. The apparatus of claim 6, wherein the logic configured to generate a kth value of ACO comprises logic configured to perform a bitwise modulo-2 sum.

8. The apparatus of claim 7, wherein the logic configured to perform a bitwise modulo-2 sum comprises logic configured to perform a bitwise exclusive-OR (XOR) operation.

9. The apparatus of claim 5, wherein the communication device includes a real-time device.

10. The apparatus of claim 5, wherein the communication device includes a non-real-time device.

* * * * *

UNITED STATES PATENT AND TRADEMARK OFFICE
CERTIFICATE OF CORRECTION

| | |
|---|---|
| PATENT NO. | : 6,988,197 B1 |
| APPLICATION NO. | : 09/632933 |
| DATED | : January 17, 2006 |
| INVENTOR(S) | : Joakim Persson et al. |

It is certified that error appears in the above-identified patent and that said Letters Patent is hereby corrected as shown below:

Col. 5, Line 32-33: Please change "ACO B" to --$ACO_B$.--

Col. 6, Line 46: Please change "SRES B," to --$SRES_B$,--

Signed and Sealed this

Twenty-sixth Day of December, 2006

JON W. DUDAS
*Director of the United States Patent and Trademark Office*